(12) United States Patent
Coffman et al.

(10) Patent No.: US 12,386,092 B2
(45) Date of Patent: Aug. 12, 2025

(54) OPTIMIZING WELL SEQUENCES IN A WELL DEVELOPMENT ZONE

(71) Applicant: ConocoPhillips Company, Houston, TX (US)

(72) Inventors: Sarah W. Coffman, Houston, TX (US); Rafael E. Paz Lopez, Houston, TX (US); Oswaldo Nunez, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 247 days.

(21) Appl. No.: 18/100,898

(22) Filed: Jan. 24, 2023

(65) Prior Publication Data

US 2023/0236335 A1    Jul. 27, 2023

Related U.S. Application Data

(60) Provisional application No. 63/302,307, filed on Jan. 24, 2022.

(51) Int. Cl.
G01V 1/52    (2006.01)

(52) U.S. Cl.
CPC ..................... *G01V 1/52* (2013.01)

(58) Field of Classification Search
CPC ....................................................... G01V 1/52
See application file for complete search history.

(56) References Cited

U.S. PATENT DOCUMENTS

| | | | |
|---|---|---|---|
| 2013/0311147 A1 | 11/2013 | Greenwood | |
| 2016/0090823 A1* | 3/2016 | Alzahabi | E21B 43/26 703/2 |
| 2017/0286879 A1 | 10/2017 | Yeager | |
| 2021/0087925 A1* | 3/2021 | Heidari | G06N 20/00 |
| 2021/0348509 A1 | 11/2021 | Al-Shahri et al. | |
| 2023/0175355 A1* | 6/2023 | Stewart | E21B 43/305 703/10 |
| 2024/0328308 A1* | 10/2024 | Lee | E21B 47/12 |

OTHER PUBLICATIONS

International Search Report and The Written Opinion of The International Searching Authority for International Application No. PCT/US2023/011423 24 Jan. 24, 2023 (20 pages).

* cited by examiner

*Primary Examiner* — Krystine E Breier
(74) *Attorney, Agent, or Firm* — Polsinelli PC

(57) ABSTRACT

A computer-implemented method for optimizing a well development sequence for a development zone includes receiving one or more inputs based on the development zone. The method can also include generating a well development plan based on the development zone and the one or more inputs. Additionally, the method can also include calculating an expected value based on the well development plan. A system and a non-transitory computer-readable medium are also provided.

15 Claims, 7 Drawing Sheets

Population of Drilling Schedules 400"

| W1 402-1 | W2 402-2 | W3 402-3 | W4 402-4 | W5 402-5 | W6 402-6 | W7 402-7 | W8 402-8 | C1 404-1 |
|---|---|---|---|---|---|---|---|---|
| W5 402-5 | W6 402-6 | W8 402-8 | W7 402-7 | W2 402-2 | W4 402-4 | W1 402-1 | W3 402-3 | C2" 404-2" |
| W1 402-1 | W3 402-3 | W5 402-5 | W7 402-7 | W2 402-2 | W6 402-6 | W8 402-8 | W4 402-4 | C3" 404-3" |
| W2 402-2 | W3 402-3 | W4 402-4 | W1 402-1 | W5 402-5 | W6 402-6 | W7 402-7 | W8 402-8 | C4 404-4 |

FIG. 4E

OPTIMIZING WELL SEQUENCES IN A WELL DEVELOPMENT ZONE

CROSS-REFERENCE TO RELATED APPLICATIONS

The present application claims priority to U.S. Provisional Patent Application No. 63/302,307 filed on Jan. 24, 2022, which is incorporated by reference in its entirety herein.

FIELD

The presently disclosed technology relates to optimizing well development sequences for a development zone and more particularly to optimizing well development sequences by permutating well sequences to yield permutated combinations and genetically selecting from the permutated combinations.

BACKGROUND

Conventional well development planning and execution is complex, costly, and inefficient. In a given development zone, multiple wells can be developed. For each well, there are many variables that can result in varying efficiencies in developing the well. Furthermore, there can be multiple sequences for developing numerous wells.

Thus, planning well development can be difficult due to the number of wells, the order in which wells are developed, and the logistical and operational considerations for developing the well. It is with these observations in mind, among others, that various aspects of the present disclosure were conceived and developed.

SUMMARY

The presently disclosed technology includes systems, apparatuses, methods, computer readable medium, and circuits for optimizing a well development sequence for a development zone. In one implementation, receiving one or more inputs based on the development zone and calculating an expected value based on the well development plan. For example, one or more processors receives one or more inputs based on the development zone; generates a well development plan based on the one or more inputs; and calculates an expected value based on the well development plan.

In another example, one or more processors for optimizing a well development sequence for a development zone is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the one or more processors to: receive one or more inputs based on the development zone; calculate an expected value based on the well development plan.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

In order to describe the manner in which the above-recited and other advantages and features of the present inventive concept can be obtained, a more particular description of the principles briefly described above will be rendered by reference to specific example implementations thereof which are illustrated in the appended drawings. Understanding that these drawings depict only exemplary implementations of the present inventive concept and are not therefore to be considered to be limiting of its scope, the principles herein are described and explained with additional specificity and detail through the use of the accompanying drawings in which:

FIG. 4E is a block diagram showing the result of the mutation of the crossover population of FIG. 4D.

DETAILED DESCRIPTION

Figure 1:
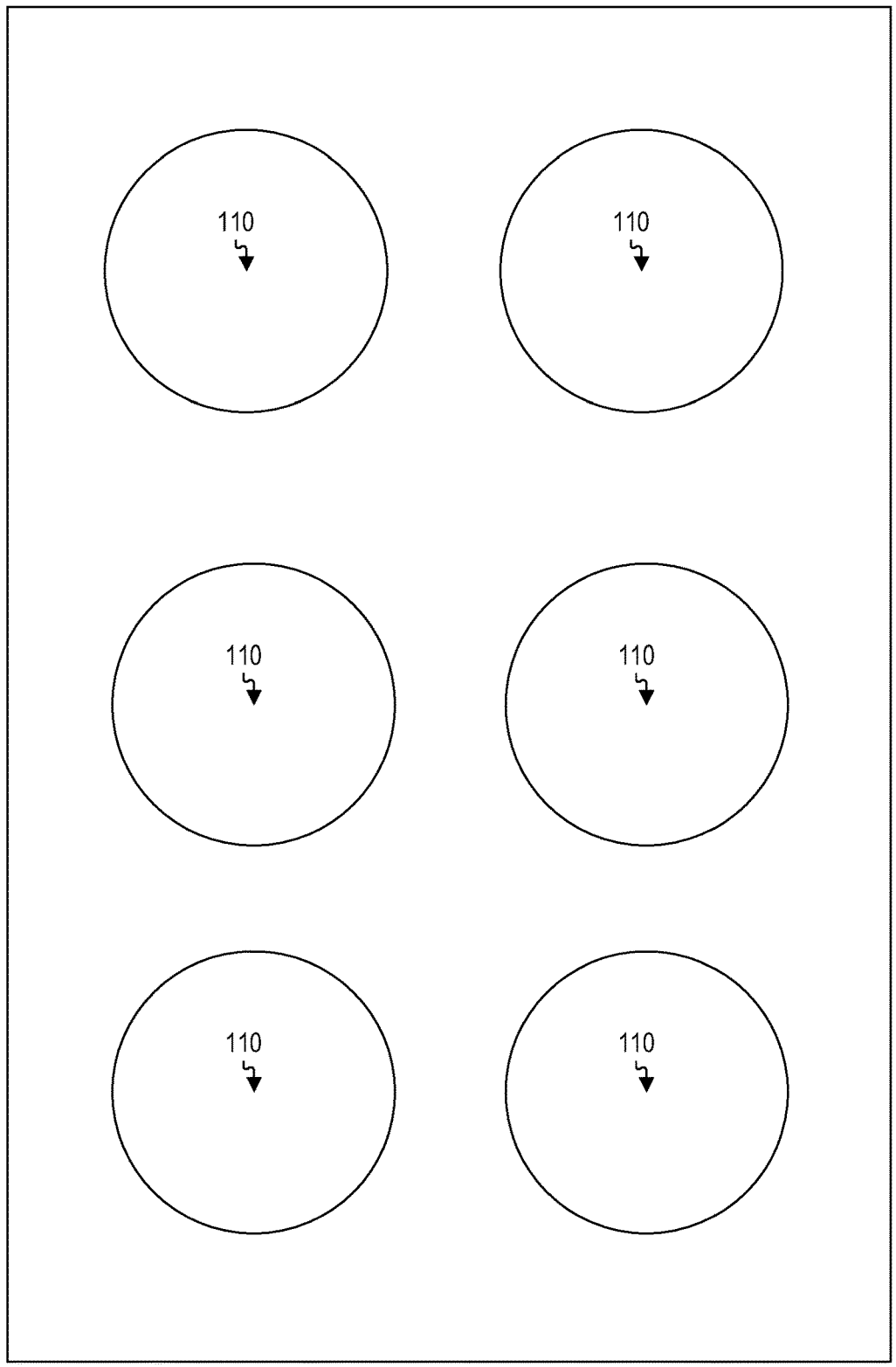
FIG. 1 illustrates a well development zone having multiple potential wells.

Well development can frequently be complex, costly, and inefficient. In a given development zone, multiple wells can be developed. Each well can be developed with different schedules, have different revenue forecasts, costs associations, etc. Furthermore, there can be multiple sequences for developing these numerous wells. Development of each well can have various different factors that result in varying expected values (e.g., expenditures and revenues). Additionally, each sequence of well development can yield different synergies. In other words, groupings of wells in a sequence can yield increased efficiencies. For example, a single drilling team can be scheduled to develop multiple nearby wells, which reduces the overall time and cost for drilling of the nearby wells. Thus, planning well development can be difficult due to the number of wells, the order in which wells are developed, and the logistical and operational considerations for developing the well. In other words, well development optimization is difficult due to the sheer number of possibilities. For example, a typical well development zone can have more than $4e^{90}$ different combinations. Accordingly, there is a need in the art for a system and/or method to efficiently develop plans for well development.

Aspects of the present technology involve systems and methods providing an efficient process for optimizing well development. The systems and methods described herein allow for inputting a large variety of different variables and scenarios for individual potential wells and/or combinations of potential wells and, based on the variables and scenarios, genetically select based on a desired expected value (e.g., revenues net costs and risks) an optimal well development plan. In one example, this genetic algorithm involves grouping a plurality of wells if the wells were on the same pad or otherwise linked.

Examples, various features, and advantageous details thereof are explained more fully with reference to the exemplary, and therefore non-limited, examples illustrated in the accompanying drawings and detailed in the following description. Descriptions of known starting materials and processes can be omitted so as not to unnecessarily obscure the present inventive concept in the detail. It should be understood, however, that the detailed description and the specific examples, while indicating the preferred examples, are given by way of illustration only and not by way of limitation. Various substitutions, modifications, additions and/or rearrangements within the spirit and/or scope of the underlying inventive concept will become apparent to those skilled in the art from this disclosure.

I. Terminology

A well sequence can include an assignment of one or more drilling wells to one or more drilling pads, drilling and/or fracturing schedules, and/or calculated values (e.g., forecasted revenue, for instance, revenue based on production, capital expenditures, for instance, expenditures to drill a new well and prepare the well for operation, operating expenditures, for example, expenditures to operate a well, and/or degradation risks, for example, risk associated with neighboring wells, etc.).

A well development plan is a plan to develop one or more potential drilling wells and can include one or more well sequences. Furthermore, the well development plan can include inter-well factors, such as increases in degradation risk when developing two or more potential wells within a proximity to each other or neighboring wells.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but can include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Further, any one of the features in the present description may be used separately or in combination with any other feature. For example, references to the term "implementation" means that the feature or features being referred to are included in at least one aspect of the present description. Separate references to the term "implementation" in this description do not necessarily refer to the same implementation and are also not mutually exclusive unless so stated and/or except as will be readily apparent to those skilled in the art from the description. For example, a feature, structure, process, step, action, or the like described in one implementation may also be included in other implementations, but is not necessarily included. Thus, the present description may include a variety of combinations and/or integrations of the implementations described herein. Additionally, all aspects of the present inventive concept as described herein are not essential for its practice.

II. General Architecture and Operations

FIG. 1 illustrates a well development zone 100 having multiple potential wells 110. Each potential well 110 is a candidate for developing and becoming a neighboring well to another one or more of the potential wells 110. Furthermore, each potential well 110 is not mutually exclusive from another potential well 110. Each potential well 110 can have various different factors for consideration of developing the potential well. For example, developing a well typically requires large capital expenditures in the form of drilling, fracturing, artificial lifts, central facilities, etc. Additionally, other factors for consideration include, but are not limited to, operating expenditures, forecasted revenues from the potential well being developed, etc.

Additionally, each potential well 110 can have synergies with other potential wells 110 (e.g., compatible drilling and/or fracturing schedules, shared usage of central facility capacities, etc.). In other words, specific groupings of wells 110 can result in higher expected values (e.g., net revenue). On the other hand, each potential well 110 can have negative and/or less of an effect on other potential wells 110. For example, a potential well 110 can pose a larger degradation risk to another nearby potential well 110. Thus, the overall expected value (e.g., revenues net costs) of the two potential wells could be lower than expected values of other potential wells and/or well sequences.

Figure 2:
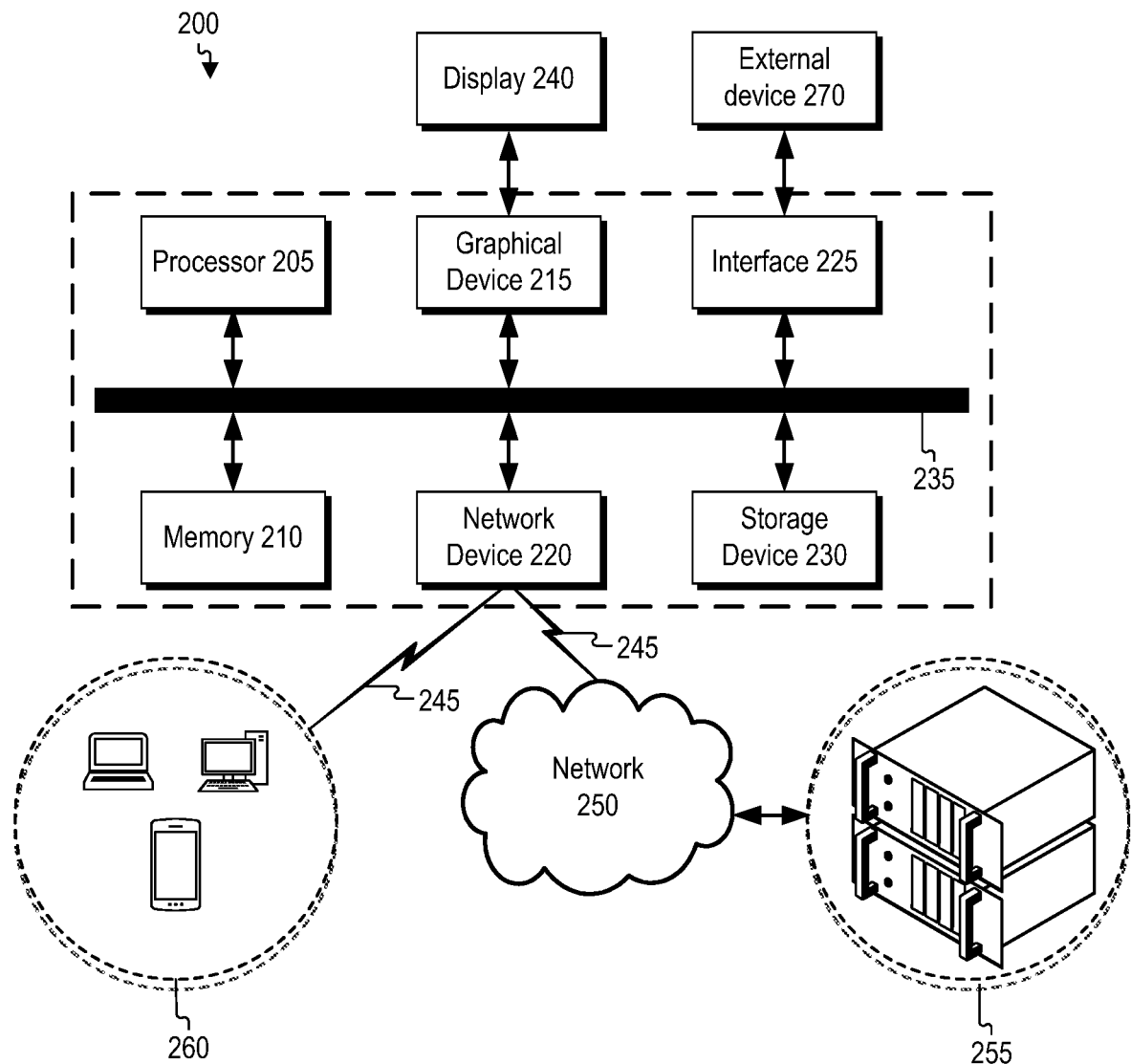
FIG. 2 illustrates an example computer system for executing a client application.

FIG. 2 illustrates an example computer system 200 for implementing a part of the present inventive concept. For example, the example computer system 200 may execute a client application for performing the present inventive concept.

The example computer system 200 includes a processor 205, a memory 210, a graphical device 215, a network device 220, interface 225, and a storage device 230 that are connected to operate via a bus 235. The processor 205 reads causes machine instructions (e.g., reduced instruction set (RISC), complex instruction set (CISC), etc.) that are loaded into the memory 210 via a bootstrapping process and executes an operating system (OS) for executing application within frameworks provided by the OS. For example, the processor 205 may execute an application that executes an application provided by a graphical framework such as Winforms, Windows Presentation Foundation (WPF), Windows User Interface (WinUI), or a cross platform user interface such as Xamarin or QT. In other examples, the processor 205 may execute an application that is written for a sandbox environment such as a web browser.

The processor 205 controls the memory 210 to store instructions, user data, OS content, and other content that cannot be stored within the processor 205 internally (e.g., within the various caches). The processor 205 may also control a graphical device 215 (e.g., a graphical processor) that outputs graphical content to a display 240. In some example, the graphical device 215 may be integral within the processor 205. In yet another example, the display 240 may be integral with the computer system 200 (e.g., a laptop, a tablet, a phone, etc.).

The graphical device 215 may be optimized to perform floating point operations such as graphical computations, and may be configured to execute other operations in place of the processor 205. For example, controlled by instructions to perform mathematical operations optimized for floating point math. For example, the processor 205 may allocate instructions to the graphical device 215 for operations that are optimized for the graphical device 215. For instance, the graphical device 215 may execute operations related to artificial intelligence (AI), natural language processing (NLP), vector math. The results may be returned to the processor 205. In another example, the application executing in the processor 205 may provide instructions to cause the processor 205 to request the graphical device 215 to perform the operations. In other examples, the graphical device 215 may return the processing results to another computer system (i.e., distributed computing).

The processor 205 may also control a network device 220 for transmits and receives data using a plurality of wireless channels 245 and at least one communication standard (e.g., Wi-Fi (i.e., 802.11ax, 802.11e, etc.), Bluetooth®, various standards provided by the 3rd Generation Partnership Project (e.g., 3G, 4G, 5G), or a satellite communication network (e.g., Starlink). The network device 220 may wirelessly connect to a network 250 to connect to servers 255 or other service providers. The network device 220 may also be connected to the network 250 via a physical (i.e., circuit) connection. The network device 220 may also directly connect to local electronic device 260 using a point-to-point (P2P) or a short range radio connection.

The processor 205 may also control an interface 225 that connects with an external device 270 for bidirectional or unidirectional communication. The interface 225 is any suitable interface that forms a circuit connection and can be implemented by any suitable interface (e.g., universal serial bus (USB), Thunderbolt, and so forth). The external device 270 is able to receive data from the interface 225 to process the data or perform functions for different applications executing in the processor 205. For example, the external device 270 may be another display device, a musical instrument, a computer interface device (e.g., a keyboard, a mouse, etc.), an audio device (e.g., an analog-to-digital converter (ADC), a digital-to-analog converter (DAC)), a storage device for storing content, an authentication device, an external network interface (e.g., a 5G hotspot), a printer, and so forth.

The client application can be configured to include a genetic algorithm having a constraint function wrapped therein. The constraint function can be configured to receive a plurality of inputs for a given well sequence including, but not limited to, integrated data from type curves, shape files, user assumptions for degradation risks between development zones, central facility capacities, price deck projections, capital expenditure estimates (e.g., drilling, fracturing, artificial lift, central facilities, operating expenses, savings from utilizing multi-well pads, information on zones that can be developed together, etc. The constraint function can then generate a development plan based on the received inputs. The development plan can include assignment of wells to pads, drilling and fracturing crew assignments based on availability, build-out plans of central facilities based on production levels, avoidance of simultaneous operation hits, etc. Additionally, the constraint function can calculate expected values including, but not limited to, capital expenditures, operation expenses, production value, and/or other economic metrics. These expected values can also consider and account for degradation risks and lost production due to shut-ins.

The constraint function can be one or more constraint functions configured to: assign wells to pads; create drilling schedules; calculate a number of days for toe prep; calculate earliest date the well will be ready for the fracturing crew; create fracturing schedules; align type curve data for each well; reduce well production for each well; calculate metrics; determine if and/or when artificial lifts may be installed; calculate and include financial metrics based on operations; allocate financial metrics on a per facility basis, determine if and/or when additional facilities may be needed; calculate objective values; generate documents for the objective values; and/or the like.

For example, for a given list of wells, the constraint function can determine a well sequence (e.g., a subset of the list of wells in a specified order) and assign wells in the well sequence to pads based on pre-processed well trajectories and various parameters including, but not limited to, which formations can be combined and physical limitations of the pad size (e.g., 6,000 ft by 2,000 ft). The constraint function can then also determine the midpoint of each pad.

As another example, the constraint function can create drilling schedules. More specifically, the constraint function can calculate: a number of days needed to drill the well based on numbers of drilling crews and start dates; a number of days to move rigs to well sites on the same pad or a different pad; multi-well savings; learning curves (e.g., crews becoming more efficient as more wells are drilled, and/or in specific formations, etc.); and/or the like. Additionally, the constraint function can calculate drilling costs based on multi-well pad savings, formations of the environment, lateral length, etc.

As yet another example, the constraint function can create fracturing schedules by assigning fracturing crews to wells that are ready for fracturing. More specifically, the constraint function can calculate a number of days to fracture the well based on number of fracturing crews, start dates, number of days to move the fracturing crew(s) to the well site on the same or a different pad, multi-well pad savings, etc. Additionally, the constraint function can calculate fracturing costs based on multi-well pad savings, formation of the environment, lateral length, single well facility pads and bulk test facility pad savings using a plurality of wells on a pad. Furthermore, the constraint function can calculate a number of days between the end of fracturing and a production date. Moreover, the constraint function can further consider how simultaneous operations concerns can delay the fracturing start day and add fracturing crew idle days.

The genetic algorithm can then repeatedly utilize the constraint function to calculate expected values for each type of metric. Additionally, the genetic algorithm can permutate various well sequences to generate various combinations of well sequence permutations. For each well sequence permutation, the genetic algorithm can apply the constraint function to generate respective development plans. The genetic algorithm can then or determine an optimal well development plan by selecting one of the permutated combinations and/or the original well sequence based on the expected values. In some examples, the selected expected value can be based on a specific metric, such as a highest net present value (NPV), a numerical value and/or quantification of an attribute of the well sequence, total revenue, etc. Thus, the genetic algorithm can continuously permutate and combine various well sequences while continually searching for a well sequence with the highest NPV. It is foreseen that the numerical value and/or quantifications of the attributes of the well sequence may be one or more units of measurement including, but not limited to a volume of a well, distance between wells, quantified degradation risks (e.g., a percentage of likelihood of degradation), percentages or other quantifications of vertical well bore overlap between a parent and an infill well in which degradation may be a factor, production multipliers for intra-layer degradation, etc. It is also foreseen that attributes of a well can include distance or proximity between other wells, size of the well, geological formations in an area associated with the well, etc.

The genetic algorithm can also be configured to have various different parameters to tune the algorithm. Some parameters may include, but are not limited to, random seeds, tournament sizes, number of generations, population size, crossover rate, mutation rate (e.g., of wells or pads), probability of mutation (e.g., of each well in a sequence), well mutation rate, pad mutation rate, etc.

Figure 3:
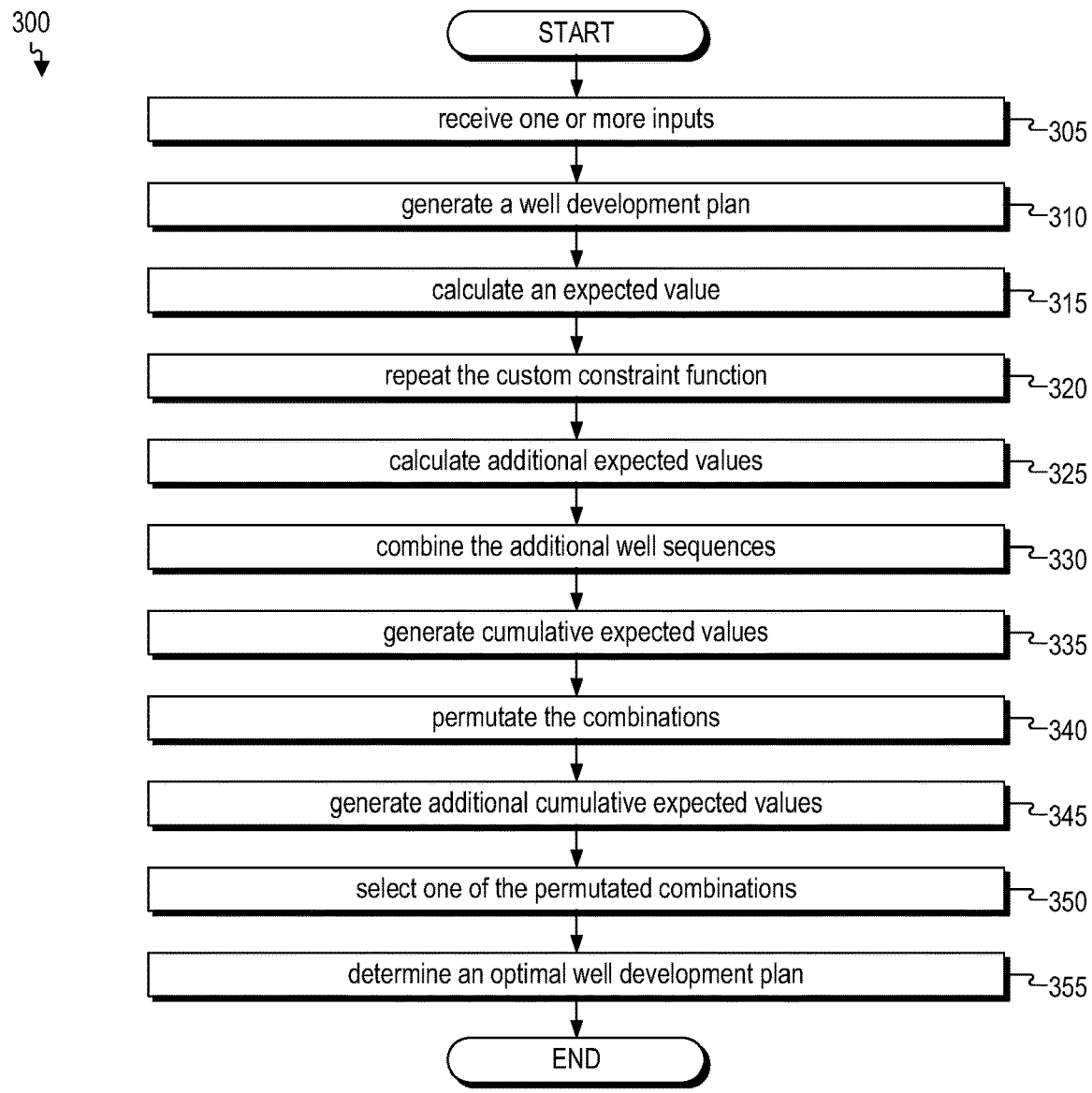
FIG. 3 is a flowchart of a method for optimizing well sequences in a well development zone according to an example of the present inventive concept.

FIG. 3 illustrates an example method 300 for optimizing well sequences in a well development zone. Although the example method 300 depicts a particular sequence of operations, the sequence may be altered without departing from the scope of the present inventive concept. For example, some of the operations depicted may be performed in parallel or in a different sequence that does not materially affect the function of the method 300. In other examples, different components of an example device or system that implements the method 300 may perform functions at substantially the same time or in a specific sequence.

At step 305, the method 300 includes receiving one or more inputs based on the development zone. For example, the processor illustrated in FIG. 2 may receive one or more inputs based on the development zone. The one or more inputs include at least one of a type curve of the development zone, shape files of the development zone, degradation risks of the development zone, facility capacities near the development zone, and cost estimates of developing the development zone.

At step 310, the method 300 includes generating a well development plan based on the development zone and the one or more inputs. For example, the processor illustrated in FIG. 2 may generate a well development plan. In some aspects, generating the well development plan includes utilizing the one or more inputs in a custom constraint function to generate a well sequence. In some aspects, the well development plan includes at least one of assignments of wells to pads, crew dispatch, facility construction, and operations scheduling. For example, the well sequence can include assignments of wells to pads, crews dispatched for drilling and/or fracturing, facility construction, and operations scheduling.

At step 315, the method 300 includes calculating an expected value based on the well development plan. For example, the processor illustrated in FIG. 2 may calculate an expected value based on the well development plan. In some aspects, the expected value is further based on the well sequence.

At step 320, the method 300 includes repeating the custom constraint function to generate additional well sequences. For example, the processor illustrated in FIG. 2 may repeat the custom constraint function to generate additional well sequences. The additional well sequences can be for other potential wells in the development zone.

At step 325, the method 300 includes calculating additional expected values for each of the additional well sequences. For example, the processor illustrated in FIG. 2 may calculate additional expected values for each of the additional well sequences.

At step 330, the method 300 includes combining the additional well sequences and respective additional expected values. For example, the processor illustrated in FIG. 2 may combine the additional well sequences and respective additional expected values.

At step 335, the method 300 includes generating cumulative expected values based on the combination of the additional well sequences and respective additional expected values. For example, the processor illustrated in FIG. 2 may generate cumulative expected values based on the combination of the additional well sequences and respective additional expected values.

At step 340, the method 300 includes permutating the combinations of the additional well sequences and respective additional expected values. For example, the processor illustrated in FIG. 2 may permutate the combinations of the additional well sequences and respective additional expected values.

At step 345, the method 300 includes generating additional cumulative expected values based on the permutated combinations. For example, the processor illustrated in FIG. 2 may generate additional cumulative expected values based on the permutated combinations.

At step 350, the method 300 includes selecting one of the permutated combinations based on a respective one of the additional cumulative expected values. For example, the processor illustrated in FIG. 2 may select one of the permutated combinations based on a respective one of the additional cumulative expected values.

At step 355, the method 300 includes determining an optimal well development plan based on the additional expected values. For example, the processor illustrated in FIG. 2 may determine an optimal well development plan based on the additional expected values. The optimal well development plan can include assignments of wells to pads, drilling and/or fracturing crew assignments based on availability, build-out of central facility capacities, price deck projections, capital expenditure estimates (e.g., expenditures on drilling, fracturing, artificial lifts, central facilities, etc.), operational expenditure estimates, savings from multi-well pads, information on which zones are optimal for development together, etc.

The optimal well development plan can be used to develop one or more wells. For example, the processor illustrated in FIG. 2 may output the optimal well development plan on a graphical user interface as a table of all dates, durations, and/or calculations for each well for presentation using a display or other presentation system. Additionally, the optimal well development plan may be output as documents that include degradation details, simultaneous operations details, drilling crew schedules, fracturing crew schedules, detailed revenue, operating expenses, capital expenditures, and other values of interest. The optimal well development plan may be used to develop wells in the development zone according to the optimal well development plan. For example, the optimal well development plan can identify specific locations in the development zone for developing a potential well into a developed well. A well may be developed accordingly in the specific location. Furthermore, the optimal well development plan can include assignments and schedules of crews for developing the well. Thus, the crews may be assigned and/or scheduled according to the optimal well development plan.

Figures 4A, 4B:
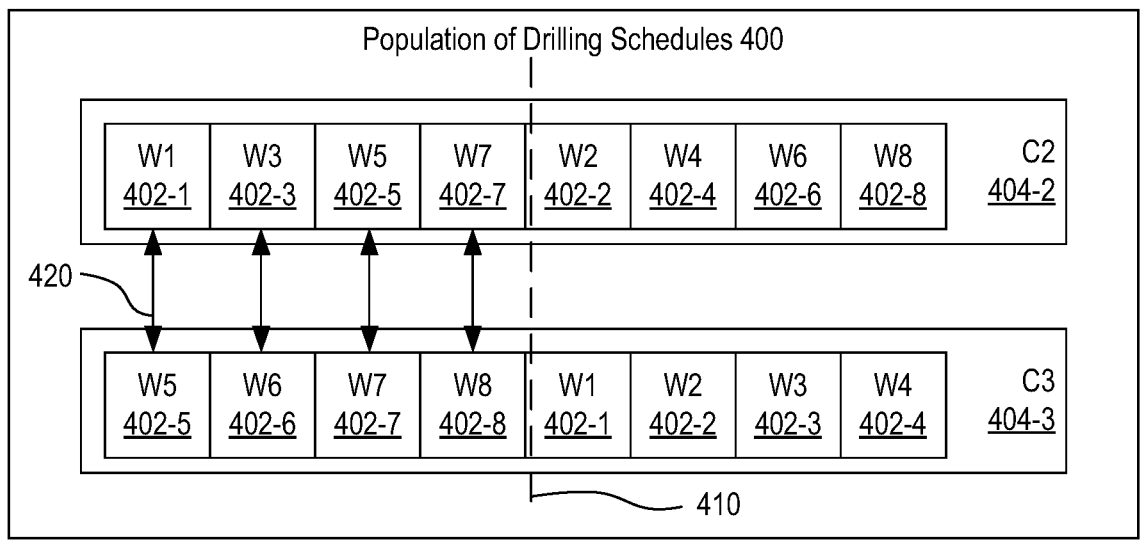
FIG. 4A is a block diagram showing a population of drilling schedules having various drilling schedules of various wells.
FIG. 4B is a block diagram showing a subset of the population of drilling schedules of FIG. 4A.

FIG. 4A is a block diagram showing a population of drilling schedules 400 having various drilling schedules 404-1, 404-2, 404-3, 404-4 (collectively drilling schedules 404) of various wells 402-1, 402-2, 402-3, 402-4, 402-5, 402-6, 402-7, 402-8 (collectively wells 402). More specifically, the genetic algorithm discussed above is configured to receive drilling schedules 404 of wells 402. The genetic algorithm can treat the drilling schedules 404 as chromosomes (e.g., C1, C2, C3, C4) and the wells 402 as genes (e.g., W1, W2, W3, etc.).

FIG. 4B is a block diagram showing a subset of the population of drilling schedules 400 of FIG. 4A. The genetic algorithm can generate a point 410 for crossing over 420 genes or wells 402 between chromosomes or drilling schedules 404. It is to be understood, however, that point 410 can be interpreted in different ways to select various genes for crossing over. For example, point 410 can indicate a range of genes (e.g., genes in the first through $n^{th}$ positions, n-number of genes from position x, etc.). The genetic algorithm can then crossover 420 the genes or wells 402 between the chromosomes or drilling schedules 404.

For example, Chromosome 2 (C2) or drilling schedule 404-2 can have a sequence of genes in the order of W1, W3, W5, W7, W2, W4, W6, W8, while Chromosome 3 (C3) or drilling schedule 404-3 can have a sequence of genes or wells 402 in the order of W5, W6, W7, W8, W1, W2, W3, W4. Additionally, the genetic algorithm can determine that point 410 is the point to stop crossing over genes. Thus, the genetic algorithm can crossover genes W1, W3, W5, W7 from C2 with genes W5, W6, W7, W8 in C3.

Figure 4C:
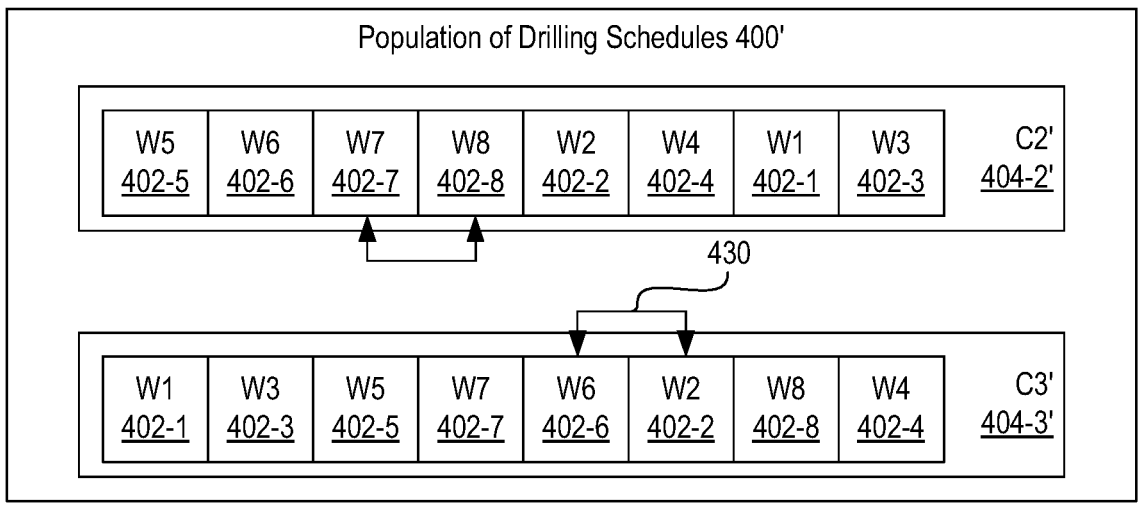
FIG. 4C is a block diagram showing a crossover of the population of drilling schedules of FIG. 4B.

FIG. 4C is a block diagram showing a crossover of the population of drilling schedules of FIG. 4B. In other words, FIG. 4C shows a crossed population of drilling schedules 400'. Additionally, genes can be adjusted or moved so that no gene or well appears in the chromosome or well sequence more than once. More specifically, the crossed chromosomes C2', C3' are results of the crossover depicted in FIG. 4B. C2' now is a drilling schedule 404-2' with a sequence of W5, W6, W7, W8, W2, W4, W1, W3, while C3' now is a drilling schedule 404-3' with a sequence of W1, W3, W5, W7, W6, W2, W8, W4.

The genetic algorithm can also mutate 430 the genes of a chromosome and/or crossed chromosome. For example, the genetic algorithm can mutate genes or wells 402, such that W7 and W8 are mutated in C2', while W1 and W2 are mutated in C3'.

Figure 4D:
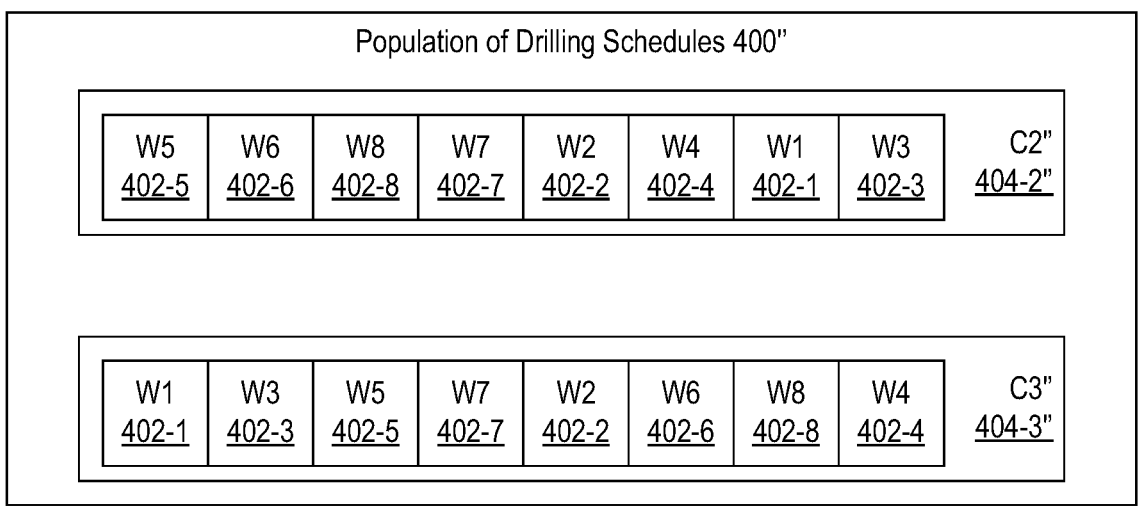
FIG. 4D is a block diagram showing a mutation of the crossover population of FIG. 4C.

FIG. 4D is a block diagram showing a mutation of the crossover population of FIG. 4C. In other words, FIG. 4D shows the mutated chromosomes C2", C3" of the crossed and mutated population of drilling schedules 400". More specifically, the mutated and crossed chromosomes C2", C3" are results of the mutation 430 of the crossed chromosomes C2', C3' depicted in FIG. 4C. C2" is now a drilling schedule 404-2" with a sequence of W5, W6, W8, W7, W2, W4, W1, W3, while C3" is now a drilling schedule 404-3" with a sequence of W1, W3, W5, W7, W2, W6, W8, W4.

FIG. 4E is a block diagram showing the result of the mutation of the crossover population of FIG. 4D. More specifically, FIG. 4E includes the mutated and crossed chromosomes C2", C3" in the population of drilling schedules 400". With this population of drilling schedules 400", the genetic algorithm can calculate expected values of this new iteration of drilling schedules. For example, the genetic algorithm can calculate an expected net revenue for each chromosome, mutated chromosome, crossed chromosome, and/or mutated and crossed chromosome. The genetic algorithm can then use the expected values of respective chromosomes and selectively iterate crossovers and mutations. In other words, the genetic algorithm can select chromosomes to use as parents (e.g., chromosomes with more desirable expected values) to repeatedly crossover and mutate until reaching an optimized chromosome or drilling schedule.

Figure 5:
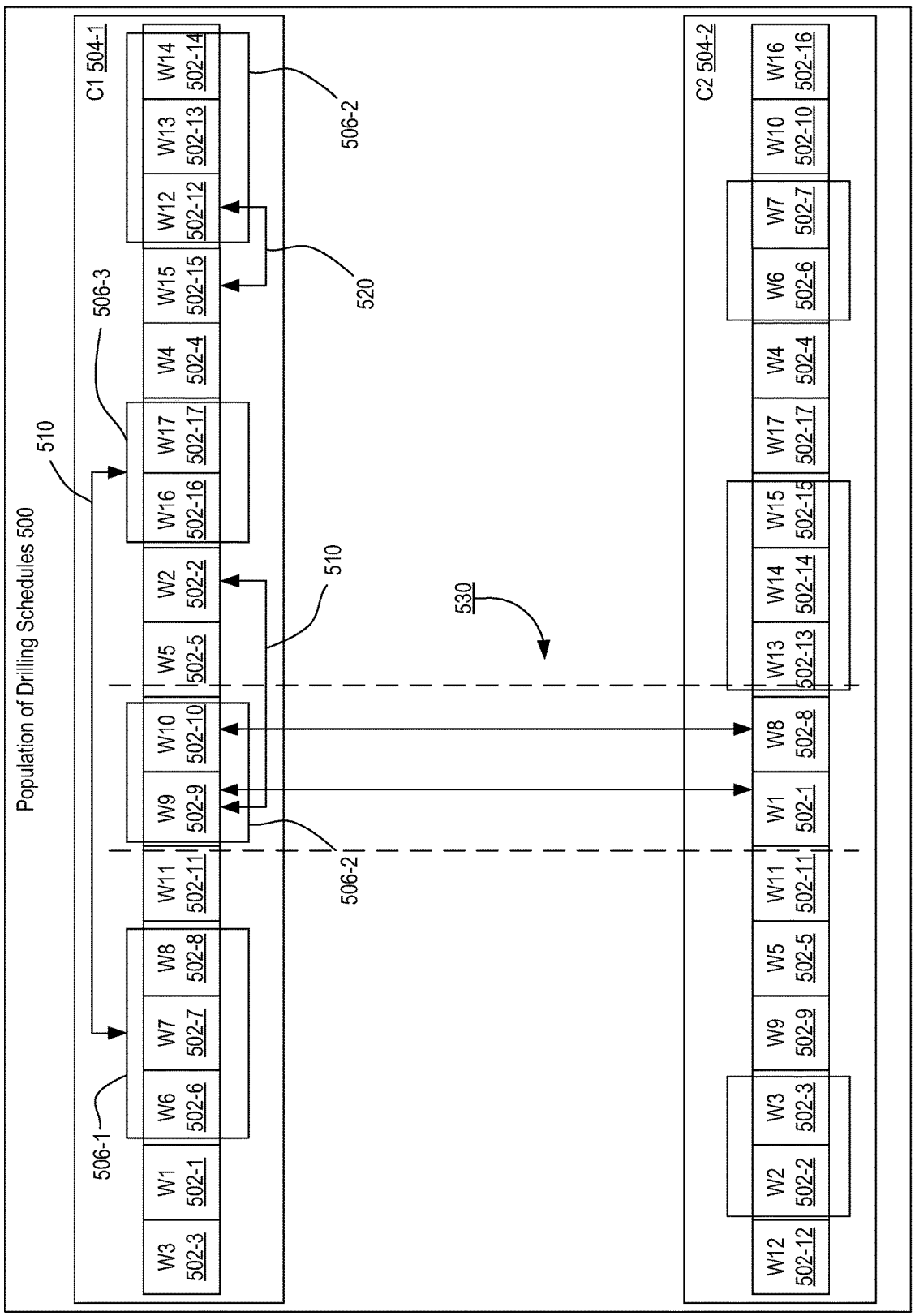
FIG. 5 is a block diagram showing groupings in a population of drilling schedules.

FIG. 5 is a block diagram showing groupings 506-1, 506-2, 506-3 506-4, 506-5, 506-6, 506-7 (collectively pads or groupings 506) of wells 502 in a population of drilling schedules 500. The genetic algorithm can group genes or wells 502 of chromosomes C1, C2 or drilling schedules 504-1, 504-2 (collectively chromosomes or drilling schedules 504) into groupings 506. In some scenarios, specific groupings 506 and sequences of specific wells 502 can yield improved efficiencies due to association with the same pad or some other synergistic properties. Additionally, the genetic algorithm can mutate 510 the groupings 506 by re-assigning or mutating which wells belong to each grouping. Additionally or alternatively, the genetic algorithm can also mutate 520 the genes or wells 502 as discussed above. Additionally or alternatively, the genetic algorithm can also crossover 530 individual genes or wells 502 and/or crossover 530 groupings 506 between chromosomes 504. As also discussed above, the genetic algorithm can mutate 510, 520 and crossover 530 the various genes 502 and groupings 506 iteratively until a given stop parameter (e.g., a given number of generations or iterations, an associated calculated value exceeding a threshold value, etc.). The genetic algorithm can then select an optimized drilling schedule from the population of drilling schedules, mutations, and/or crossovers. The optimized drilling schedule can then be output to a user interface for interpretation by a user. Thus, the optimized drilling schedule can then be used to develop wells efficiently.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to the present inventive concept can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in this disclosure.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method to optimize a well development plan for a development zone, the computer-implemented method comprising:
   receiving, at a computing device, one or more inputs based on the development zone;
   generating, by an application executing on the computing device, an initial well development plan based on the development zone by utilizing the one or more inputs in a custom constraint function, wherein the initial well development plan includes an initial well sequence;
   calculating, by the application, an initial expected value for the initial well development plan corresponding to the initial well sequence;
   generating, by the application, a plurality of alternative well sequences by permutating the initial well sequence;
   generating, by the application, a plurality of alternative expected values corresponding to each of the plurality of alternative well sequences;
   determining, by the application, an optimal well development plan by selecting the initial well sequence or one of the plurality of alternative well sequences based on the corresponding initial expected value or the corresponding alternative expected value; and
   causing the optimal well development plan to display on a display.

2. The computer-implemented method of claim 1, wherein the initial expected value is further based on the initial well sequence.

3. The computer-implemented method of claim 1, wherein the one or more inputs include at least one of a type curve of the development zone, shape files of the development zone, degradation risks of the development zone, facility capacities near the development zone, or cost estimates of developing the development zone.

4. The computer-implemented method of claim 1, wherein generating the plurality of alternative well sequences includes repeating the custom constraint function to generate additional the plurality of alternative well sequences.

5. The computer-implemented method of claim 1, wherein the well development plan includes at least one of assignments of wells to pads, crew dispatch, facility construction, or operations scheduling.

6. A system comprising:
   at least one processor; and
   at least one memory storing computer-executable instructions thereon, the computer-executable instructions, when executed by the at least one processor, cause the at least one processor to:
   receive one or more inputs based on a development zone;
   generate an initial well development plan based on the development zone by utilizing the one or more inputs in a custom constraint function, wherein the initial well development plan includes an initial well sequence;
   calculate an initial expected value for the initial well development plan corresponding to the initial well sequence;
   generate a plurality of alternative well sequences by permutating the initial well sequence;
   generate a plurality of alternative expected values corresponding to each of the plurality of alternative well sequences; and
   determine an optimal well development plan by selecting the initial well sequence or one of the plurality of alternative well sequences based on the corresponding initial expected value or the corresponding alternative expected value; and
   at least one display configured to display the optimal well development plan.

7. The system of claim 6, wherein the initial expected value is further based on the initial well sequence.

8. The system of claim 6, wherein the one or more inputs include at least one of a type curve of the development zone, shape files of the development zone, degradation risks of the development zone, facility capacities near the development zone, or cost estimates of developing the development zone.

9. The system of claim 6, wherein generating the plurality of alternative well sequences includes repeating the custom constraint function to generate the plurality of alternative well sequences.

10. The system of claim 6, wherein the well development plan includes at least one of assignments of wells to pads, crew dispatch, facility construction, and operations scheduling.

11. One or more non-transitory computer-readable media comprising instructions thereon, the instructions configured to cause at least one processor to:
   receive one or more inputs based on a development zone;
   generate an initial well development plan based on the development zone by utilizing the one or more inputs in a custom constraint function, wherein the initial well development plan includes an initial well sequence;
   calculate an initial expected value for the initial well development plan corresponding to the initial well sequence;
   generate a plurality of alternative well sequences by permutating the initial well sequence;

generate a plurality of alternative expected values corresponding to each of the plurality of alternative well sequences;

determine an optimal well development plan by selecting the initial well sequence or one of the plurality of alternative well sequences based on the corresponding initial expected value or the corresponding alternative expected value; and cause the optimal well development plan to display using a display.

12. The one or more non-transitory computer-readable media of claim 11, wherein the initial expected value is further based on the initial well sequence.

13. The one or more non-transitory computer-readable media of claim 11, wherein the one or more inputs include at least one of a type curve of the development zone, shape files of the development zone, degradation risks of the development zone, facility capacities near the development zone, and cost estimates of developing the development zone.

14. The one or more non-transitory computer-readable media of claim 11, wherein
generating the plurality of alternative well sequences includes repeating the custom constraint function to generate the plurality of alternative well sequences.

15. The one or more non-transitory computer-readable media of claim 11, wherein the well development plan includes at least one of assignments of wells to pads, crew dispatch, facility construction, and operations scheduling.

* * * * *